March 27, 1962 R. P. FINNERTY 3,027,005

PHONOGRAPH RECORD HOLDER

Filed May 27, 1960 3 Sheets-Sheet 1

INVENTOR.
ROBERT P. FINNERTY
BY Bosworth, Sessions, Herrstrom & Knowles
ATTORNEYS.

March 27, 1962 R. P. FINNERTY 3,027,005

PHONOGRAPH RECORD HOLDER

Filed May 27, 1960 3 Sheets-Sheet 2

INVENTOR.
ROBERT P. FINNERTY
BY Bosworth, Sessions, Herrstrom & Knowles
ATTORNEYS.

March 27, 1962 R. P. FINNERTY 3,027,005

PHONOGRAPH RECORD HOLDER

Filed May 27, 1960 3 Sheets-Sheet 3

INVENTOR.
ROBERT P. FINNERTY
BY Bosworth, Sessions, Herrstrom & Knowles
ATTORNEYS.

United States Patent Office 3,027,005
Patented Mar. 27, 1962

3,027,005
PHONOGRAPH RECORD HOLDER
Robert P. Finnerty, Cleveland, Ohio
(122 Miles St., Santa Cruz, Calif.)
Filed May 27, 1960, Ser. No. 32,191
12 Claims. (Cl. 206—62)

This invention relates broadly to disk holders and, more particularly, to holders for phonograph records.

The invention has for one of its objects the provision of a record holder incorporating a record cradle that normally occupies very little space but is intrinsically capable of being expanded with a minimum of effort to present the contained record edgewise to the person or persons desiring to use it. On the other hand, because any expansion tends to detract from the cradling function and because over-expansion is undesirable, the invention contemplates that the extent of the expansion will be restricted to a degree such as to make for a top opening of optimum proportions. Such a record holder, suitably designed, may take any of a variety of physical forms, some adapted for use on a table, some to use on shelves or in drawers, and others to incorporation in cabinets.

The invention has for another of its objects to provide a record holder of this kind in which the cradle opening, although entirely adequate for the intended purpose, is so arranged as to make it impossible for a given record, even when introduced or withdrawn at an angle, to come into contact with the surface of an adjacent record. To the serious collector of phonograph records it is important that a record holder shall be so constructed that of two adjacent records neither will come into contact with the playing surfaces of the other. Not only this, but if possible nothing else must be allowed to come into contact with such surface.

To these ends, the invention provides a novel form of record holder characterized, among other things, by a record cradle having a diamond-shaped top opening, diverging side walls, and, at the base of the side walls, a contoured spine serving as a rest for the record. Associated in some suitable fashion with such cradle will usually be two side panels coupled together in such a way as to permit limited movement between them. These panels will normally be of stiff, wear-resistant material. In one of the preferred forms of the invention, they are hinged together; however, they may, if desired, be connected in any other suitable fashion.

Other objects, advantages and features of the invention will be apparent from the description which follows and from the accompanying drawings, in which.

Figure 6:
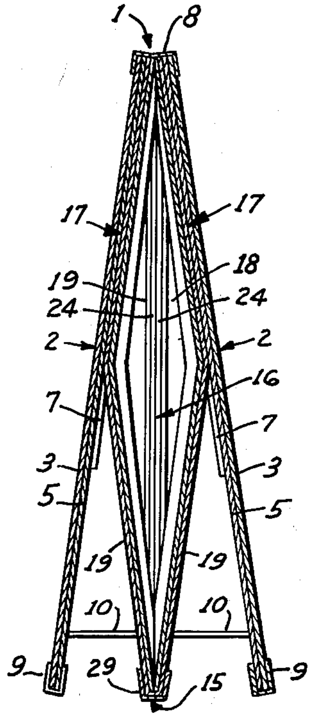
FIGURE 6 is a section, on an enlarged scale, on line 6—6 of FIGURE 1.
Figure 7:
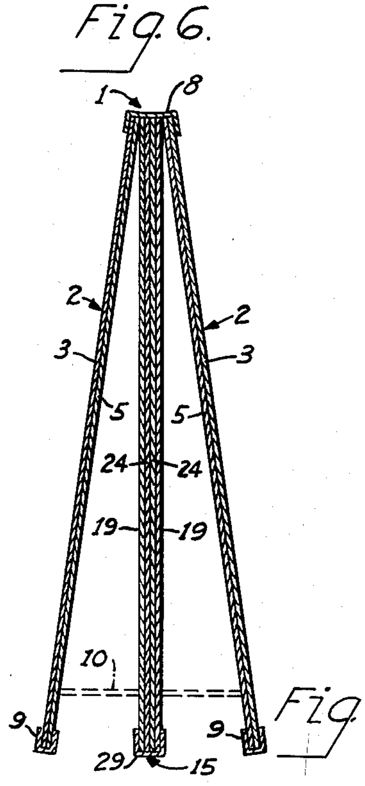
FIGURE 7 is a section, on an enlarged scale, on line 7—7 of FIGURE 1.
Figures 1, 2:
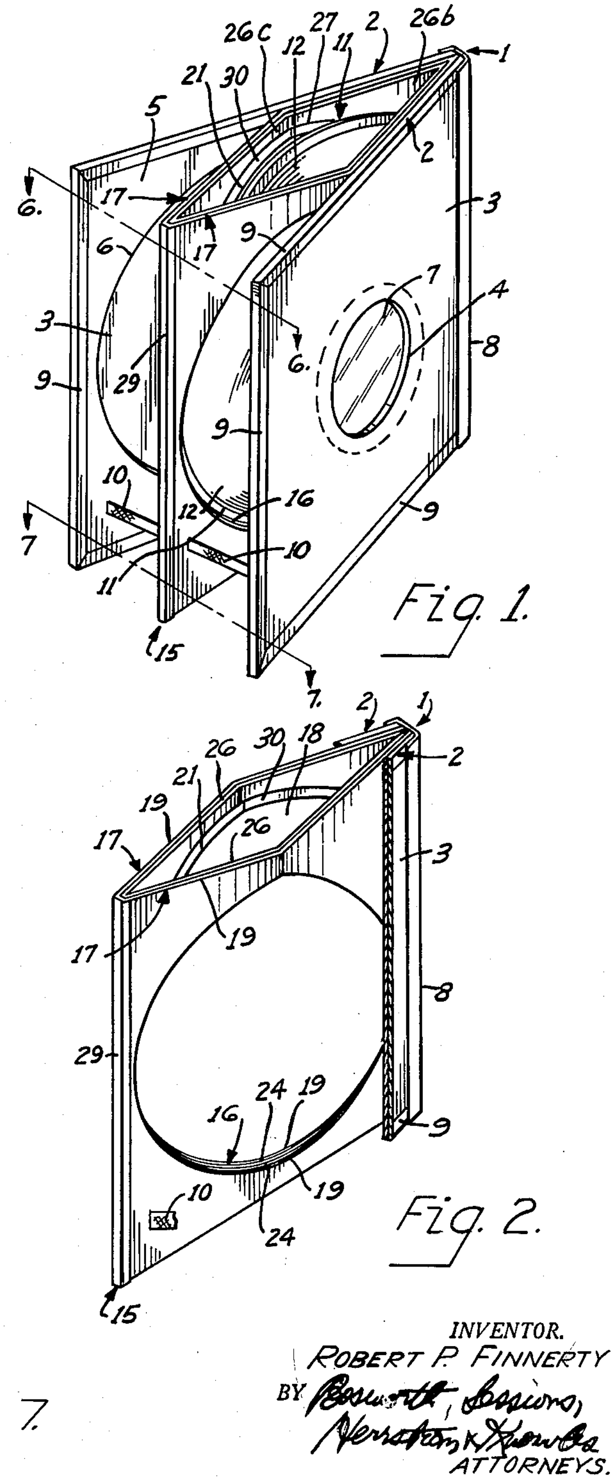
FIGURE 1 is a perspective of a hinged record holder within the purview of the present invention.
FIGURE 2 is a perspective of the record holder with the side panels broken away to show the construction of the cradle.

FIGURE 1 shows a record holder within the purview of the invention, such record holder taking the form of an album. Designated 1, it consists among other things of two side panels 2 of stiff, wear-resistant material. Each side panel 2 is made up of a square outer sheet 3 provided at its center with a circular viewing opening 4 of approximately the same diameter as that of the conventional record label. Adhered to sheet 3 is a square inner sheet 5 of the same size as sheet 3, such inner sheet being provided at its center with a circular opening 6 of approximately the same diameter as that of the playing surface of a conventional long-playing record. A circular pad 7 of transparent plastic material is attached as a window to the inside face of sheet 3: See FIGURE 3.

Side panels 2 may be held together in any convenient way, but in the form of the invention shown in the drawings are coupled to each other by means of a tape hinge 8 that parallels and conceals the rear edges of the panels. The other edges of the side panels are bound with edge tapes 9, although they may, if desired, be finished in some other suitable fashion. To prevent over-expansion of record holder 1, a fabric ribbon 10 extends from one to the other of the two side panels, being attached to them at its ends. It is fastened midway between its two ends to the cradle in which the record is contained. Record 11 appears in FIGURE 1, wherein its playing surface is designated 12.

The record cradle, designated 15, is characterized by a generally semi-circular spine 16 best seen in FIGURES 1 and 2, which engages the periphery of the lower half of the record when the record holder is in use. As will appear below, spine 16 consists of a number of sheets of material, usually a minimum of four, providing a narrow but nevertheless adequate rest for the record. Above spine 16, cradle 15 is characterized by divergent side walls 17 and, between them, by a diamond-shaped top opening 18. When the record holder is in closed position, top opening 18 is non-existent. It develops when side panels 2 are separated. The ribbon 10 which limits the extent of expansion of the record holder also limits the size of top opening 18.

Figures 3, 4:
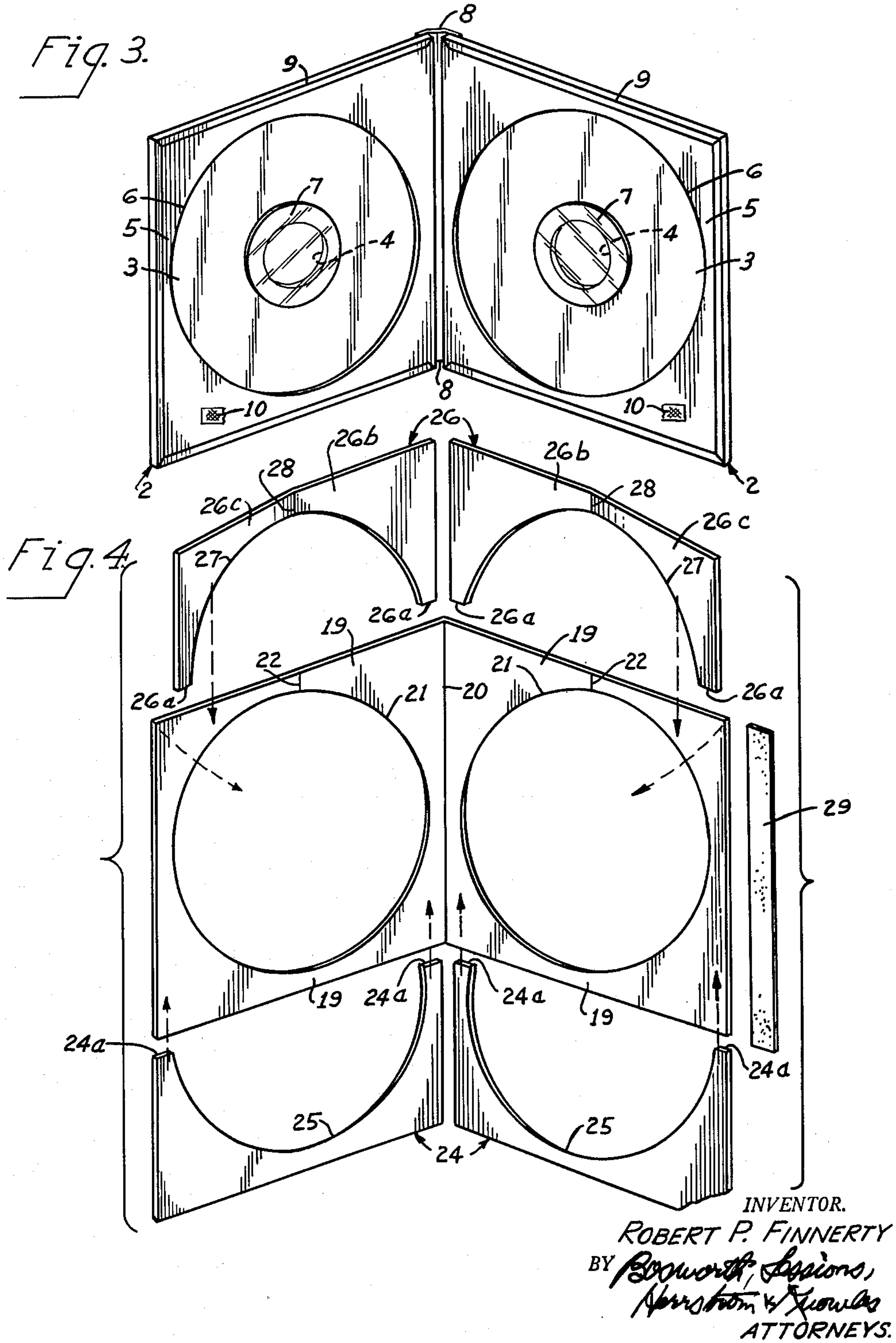
FIGURE 3 is a perspective of the side panels without the cradle, the side panels being represented as opened out to an abnormal degree.
FIGURE 4 is an exploded view showing the components making up the cradle.

As appears from FIGURE 4, the side walls of cradle 15 are made up of five appropriately shaped pieces of cardboard or other moderately stiff material. The principle one of the five pieces is an oblong sheet 19 that is twice as long as it is wide. It is provided with a transverse central score line 20 to facilitate holding the two halves of the sheet toward each other as shown. Each of the two halves of the sheet is provided with a circular opening 21 of a diameter slightly greater than that of playing surface 12 of record 11. Each of the two halves of sheet 19 is further provided just below the top thereof with a short vertical score line 22 on which it can be folded to develop diamond-shaped top opening 18.

Overlying and lining the lower portions of the two halves of sheet 19 are two lesser pieces 24 formed as rectangles with semi-circular cut-out portions 25. Overlying the upper portions thereof are two like pieces 26 provided with semi-circular cut-out portions 27 and short vertical score lines 28. Overlay sheets 24 and 26 appear in exploded fashion at the bottom and top, respectively, of FIGURE 4. It will be noted that overlay sheets 24 and 26 are cusped at their ends, although in each case the cusp is truncated at 24*a* or 26*a*, as the case may be.

Figure 5:
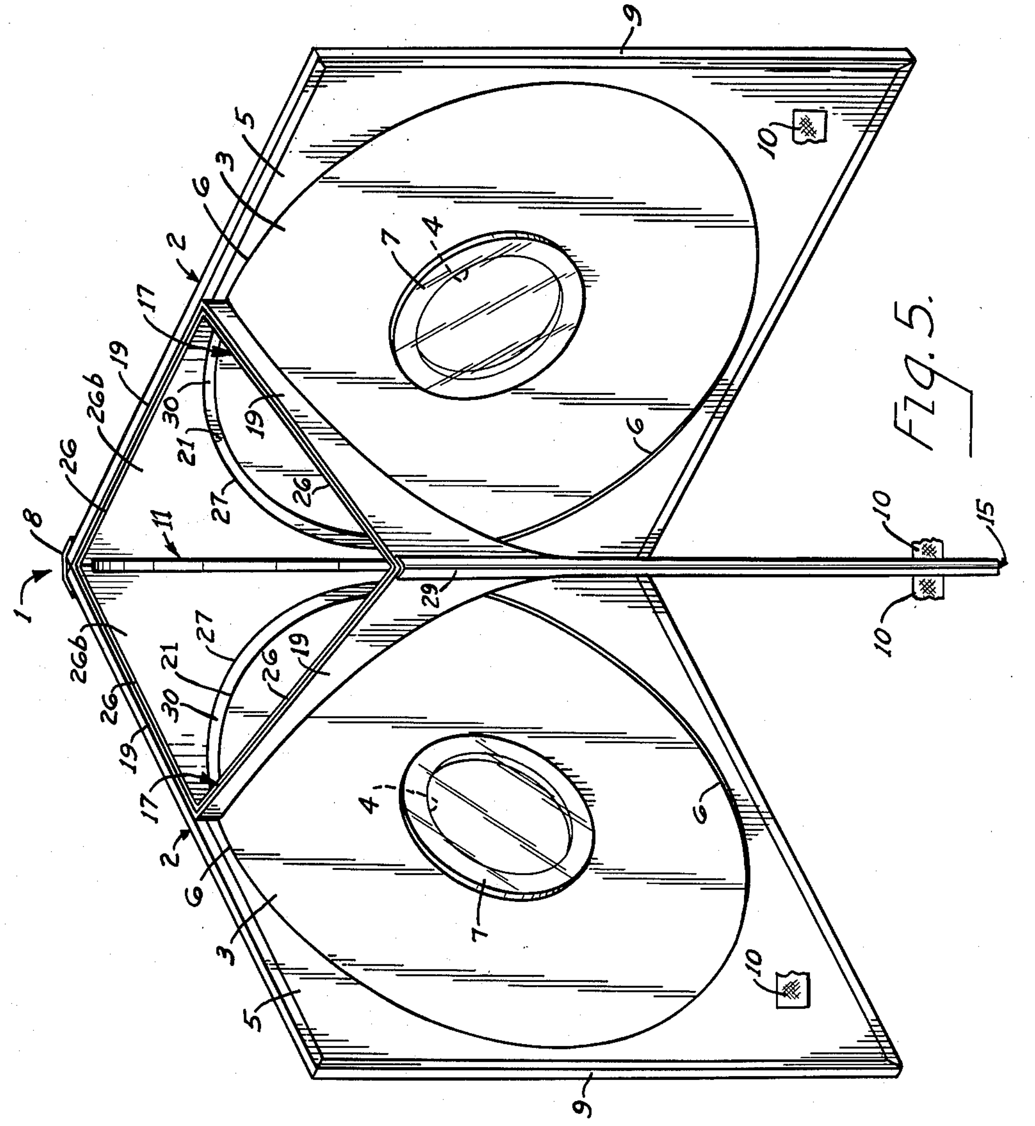
FIGURE 5 is a perspective view of the record holder on a larger scale, the showing including the cradle but in other respects being similar to that of FIGURE 3.

By virtue of the presence of semi-circular cut-out portions 27 and score lines 28, each of the two overlay sheets 26 may be considered as made up of an inner quadrant 26*b* and an outer quadrant 26*c*. Quadrants 26*b* and 26*c* are attached in suitable fashion, as by means of glue, to the corresponding portions of sheet 19. The portions of sheet 19 which back quadrants 26*b* (but not those portions that back quadrants 26*c*) are themselves attached, as by means of glue, to side panels 2: see FIGURES 1 and 5. Overlay sheets 24 are attached to sheet 19 below overlay sheets 26; however, in this region sheet 19 is not adhered to either of the two side panels but is free to move independently of them. To form cradle 15, overlay sheets 24 are glued or otherwise attached to each other. Edge tape 29 serves to hold together the outermost edges of cradle 15, this being best shown in FIGURE 5.

Inasmuch as circular openings 21 in sheet 19 are roughly coextensive with the playing surface 12 of record 11 and inasmuch as semi-circular cut-out portions 25 and 27 in overlay sheets 24 and 26, respectively, are of roughly the same diameter as the over-all diameter of the record, it follows that where overlay sheets 24 and 26 fail to cover sheet 19 there will be an annular shoulder 30 in side walls 17 of cradle 15; see FIGURES 1 and 2. This shoulder is adapted to engage the rim of record 11 when the record holder is closed. At this stage, record 11 is cradled on spine 16 over its lower portion and held against movement by the pressure imposed on it by pads 7. Playing surface 12 is out of contact not only with cradle 15 but with side panels 2. Such contact as record 11 has with side panels 2 is only where pads 7 bear against the portion of the record carrying the label.

When the record holder is opened up to the extent indicated in FIGURE 1, side walls 17 of cradle 15 move away from record 11. The upper portion of the record then is freely accessible to the user through opening 18. He is free to withdraw it vertically, grasping it by the rim intervening between playing surface 12 and the periphery of the record. Below the central axis of the cradle, side walls 17 of cradle 15 do not separate, remaining intact by virtue of the fact that overlay sheets 24 are glued together as previously described to form the cradle.

In this same zone, the original thickness of the spine 16 remains as before, continuing to provide substantial support for the lower portion of record 11 when the latter is re-inserted. If desired, the thickness of the spine may be increased by introducing between overlay sheets 24 and sheet 19 one or more filler pieces of the same shape as overlay sheets 24 or by applying external reinforcing pieces corresponding in shape to overlay sheets 24 to the lower portions of the outer faces of side walls 17. If the latter is done, correspondingly shaped portions of inner sheets 5 of side panels 2 may be cut away to accommodate the reinforcing pieces so added.

It is apparent that the side panels forming part of the record holder of the present invention may be coupled together in other ways than by the means shown in the accompanying drawings. Other means may be used for attaching the cradle to the panels. If desired, the construction of the cradle may be of some other type than the type illustrated. Other changes may be made in the panels and/or cradle as by replacing by equivalents individual features to which reference has already been made in preceding paragraphs. Also, the record holder as a whole need not take the form shown in FIGURE 1, but, if desired, may be so organized that it opens in different fashion. If desired, several cradles may be used; if so, they may be interconnected in any convenient fashion. Various other changes of similar nature may be made by those skilled in the art to which the invention relates.

It is intended that the patent shall cover, by summarization in appended claims, all features of patentable novelty residing in the invention.

What is claimed is:

1. A phonograph record holder comprising a first panel of stiff, wear-resistant material; a second panel of stiff, wear-resistant material; means coupling the two panels together in a manner permitting only limited movement between them; and, engaging each of the two panels, a record cradle provided with means for forming a polygonal opening for inserting and removing the record, side walls converging toward each other from such opening, and, where the side walls meet, a generally semi-circular spine for engaging the periphery of the record.

2. A record holder according to claim 1 in which the side walls of the cradle engage the panels above the transverse axis of the cradle.

3. A record holder according to claim 2 in which the engagement between the panels and the sidewalls of the cradle extends over approximately a quarter of the area of each side wall.

4. A record cradle comprising a spine of generally semi-circular shape, side walls above the spine, and means for forming a polygonal opening at the top of the side walls whenever the side walls are separated.

5. A record cradle according to claim 4 in which the top opening when formed is trapezoidal in shape.

6. A record cradle according to claim 5 in which the top opening when formed is diamond-shaped.

7. A phonograph record holder comprising a first panel of stiff, wear resistant material; and a second panel of stiff, wear-resistant material; pads on the inside faces of the panels; a record cradle between the pads, said cradle incorporating a generally semi-circular spine of greater thickness than the record to be cradled; and means coupling together the panels and the cradle.

8. A record holder according to claim 7 in which the pads take the form of transparent plastic discs elevated above the planes of the panels.

9. A record holder according to claim 8 in which the panels are provided with viewing openings in alignment with the transparent plastic discs.

10. A phonograph record holder comprising a first panel of generally rectangular shape provided with a circular recess on one side thereof; a second panel of generally rectangular shape provided with a circular recess on one side thereof; pads centered in said recesses; means coupling the panels together with the pads confronting each other and the recesses in registry; and, engaging each of the two panels, a record cradle provided with means for forming a polygonal opening for inserting and removing the record, side walls converging toward each other from such opening, and, where the side walls meet, a generally semi-circular spine for engaging the periphery of the record.

11. A record holder according to claim 10 in which the spine is thicker than the record that it is intended to accommodate.

12. A record holder according to claim 11 in which the spine is cusped at each of its two ends.

References Cited in the file of this patent

UNITED STATES PATENTS

| | | |
|---|---|---|
| 1,295,763 | Kohn | Feb. 25, 1919 |
| 2,691,440 | Spugios et al. | Oct. 12, 1954 |